United States Patent
Sella et al.

(10) Patent No.: US 9,137,010 B2
(45) Date of Patent: Sep. 15, 2015

(54) WATERMARK WITH DATA INTEGRITY VERIFICATION

(71) Applicant: Cisco Technology Inc., San Jose, CA (US)

(72) Inventors: Yaron Sella, Beit Nekofa (IL); Harel Cain, Jerusalem (IL); Michal Devir, Haifa (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/153,387

(22) Filed: Jan. 13, 2014

(65) Prior Publication Data

US 2015/0200773 A1    Jul. 16, 2015

(51) Int. Cl.
*H04L 9/08* (2006.01)
*H04N 1/32* (2006.01)
*G06F 21/22* (2006.01)

(52) U.S. Cl.
CPC .......... *H04L 9/0816* (2013.01); *H04N 1/32144* (2013.01); *H04L 2209/24* (2013.01); *H04N 2201/3236* (2013.01)

(58) Field of Classification Search
CPC ............... H04N 21/44055; H04N 21/4623; H04N 21/4405; H04N 21/4408; G06F 21/10; G06F 21/16; G06F 21/105; H04L 9/88; H04L 9/0836; H04L 9/0891
USPC ...................... 380/277, 240, 44; 713/176, 190
See application file for complete search history.

(56) References Cited

U.S. PATENT DOCUMENTS

| | | | |
|---|---|---|---|
| 6,901,515 B1 | 5/2005 | Muratani | |
| 7,020,304 B2 | 3/2006 | Alattar et al. | |
| 7,158,653 B2 | 1/2007 | Fletcher et al. | |
| 7,970,141 B2 * | 6/2011 | Boneh et al. | 380/277 |
| 8,135,168 B2 | 3/2012 | Geyzel et al. | |

(Continued)

FOREIGN PATENT DOCUMENTS

| | | |
|---|---|---|
| CN | 101488214 B | 7/2011 |
| WO | WO 98/11492 | 3/1998 |
| WO | WO 00/67477 | 11/2000 |

OTHER PUBLICATIONS

A. Ahmad et al., "On Locking Conditions in M-Sequence Generators for the Use in Digital Watermarking," *International Conference on Methods and Models in Computer Science*, (2009).

(Continued)

*Primary Examiner* — Kambiz Zand
*Assistant Examiner* — Noura Zoubair
(74) *Attorney, Agent, or Firm* — Hahn Loeser & Parks LLP

(57) ABSTRACT

In one embodiment, a system including a processor is operative to receive a content item including a watermark encoding a series of encrypted bits deriving from encrypting an information element multiple times, extract at least some encrypted bits from at least part of the watermark, decrypt a series of N bits using a first key yielding a first value, the series of N bits including Q bits of the encrypted bits and K, greater than, or equal to zero, guessed bits, re-encrypt the first value using a second key yielding a second value, and compare at least part of the second value to M bits of the encrypted bits to determine if at least part of the second value matches the M bits in order to provide a level of confidence that the first value is the information element which was encrypted and embedded as the watermark.

16 Claims, 9 Drawing Sheets

(56) References Cited

U.S. PATENT DOCUMENTS

| | | |
|---|---|---|
| 8,189,863 B1 | 5/2012 | Rucklidge |
| 8,300,884 B2 | 10/2012 | Sharma |
| 2002/0169972 A1 | 11/2002 | Tanaka et al. |
| 2009/0041237 A1 | 2/2009 | Takashima et al. |
| 2009/0193065 A1 | 7/2009 | Vijayarangan et al. |
| 2010/0332826 A1 | 12/2010 | Lin |
| 2012/0076346 A1 | 3/2012 | Brundage et al. |
| 2013/0191644 A1* | 7/2013 | Horne et al. .................. 713/176 |

OTHER PUBLICATIONS

Michael Arnold et al., *Techniques and Applications of Digital Watermarking and Content Protection*, (Artech House 2003).

Chunhua Dong et al., "Zero Watermarking for Medical Images Based on DFT and LFSR," International Conference on Computer Science and Automation Engineering, vol. 1, pp. 22-26 (IEEE 2012).

S. Bhargav Kumar et al., "LFSR Based Watermark and Address Generator for Digital Image Watermarking SRAM," *International Journal of Computer Organization Trends*, vol. 2, Issue 3, pp. 73-79 (2012).

S. Bhargav Kumar, "On-Chip Address and Test Pattern Generation for Image Watermarking SRAM" *International Journal of Advanced Scientific and Technical Research*, issue 3, vol. 2, pp. 389-397 (Apr. 2013).

Xiangxue Li et al., "LFSR-Based Signatures With Message Recovery," *International Journal of Network Security*, vol. 4 No. 3, pp. 266-270 (May 2007).

* cited by examiner

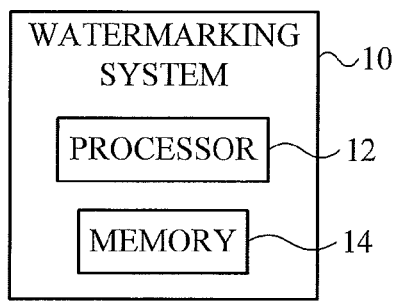
FIG. 1
FIG. 2
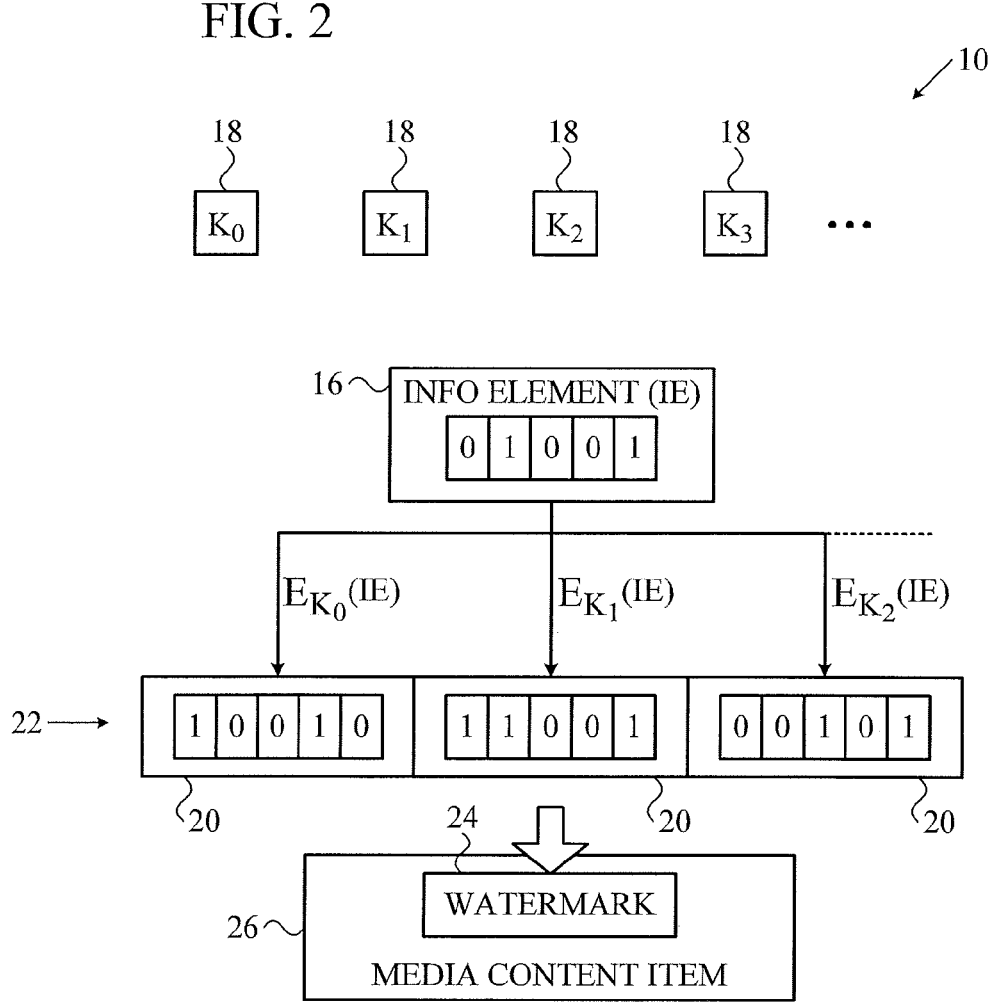

WATERMARK WITH DATA INTEGRITY VERIFICATION

FIELD OF THE INVENTION

The present invention relates to watermarks, and in particular, but not exclusively to, a watermark with data integrity verification.

BACKGROUND OF THE INVENTION

By way of introduction, the process of hiding or embedding information in a computer-aided fashion in a video, audio or any suitable media item generally comes under the overall category of watermarking. The watermarking process is typically called "digital watermarking" when the embedded data identifies the media-item itself or the content-owner, and sometimes known as "forensic fingerprinting" when the embedded data identifies the consumer of the media-item. In forensic fingerprinting, if a user were to leak some piece of content, his/her identity (ID) could be traced using information hidden in the content. A common watermarking requirement is to make the leaker detection/identification process as efficient as possible, so that even a small fragment ("window") of the media-item would allow traitor tracing (identifying an illegitimate distributor (traitor) of the media item).

BRIEF DESCRIPTION OF THE DRAWINGS

The present invention will be understood and appreciated more fully from the following detailed description, taken in conjunction with the drawings in which:

FIG. 1 is a partly pictorial, partly block diagram view of a watermarking system constructed and operative in accordance with an embodiment of the present invention;

FIG. 2 is a partly pictorial, partly block diagram view of an information element being encrypted by the watermarking system of FIG. 1;

DESCRIPTION OF EXAMPLE EMBODIMENTS

Overview

Figure 3:
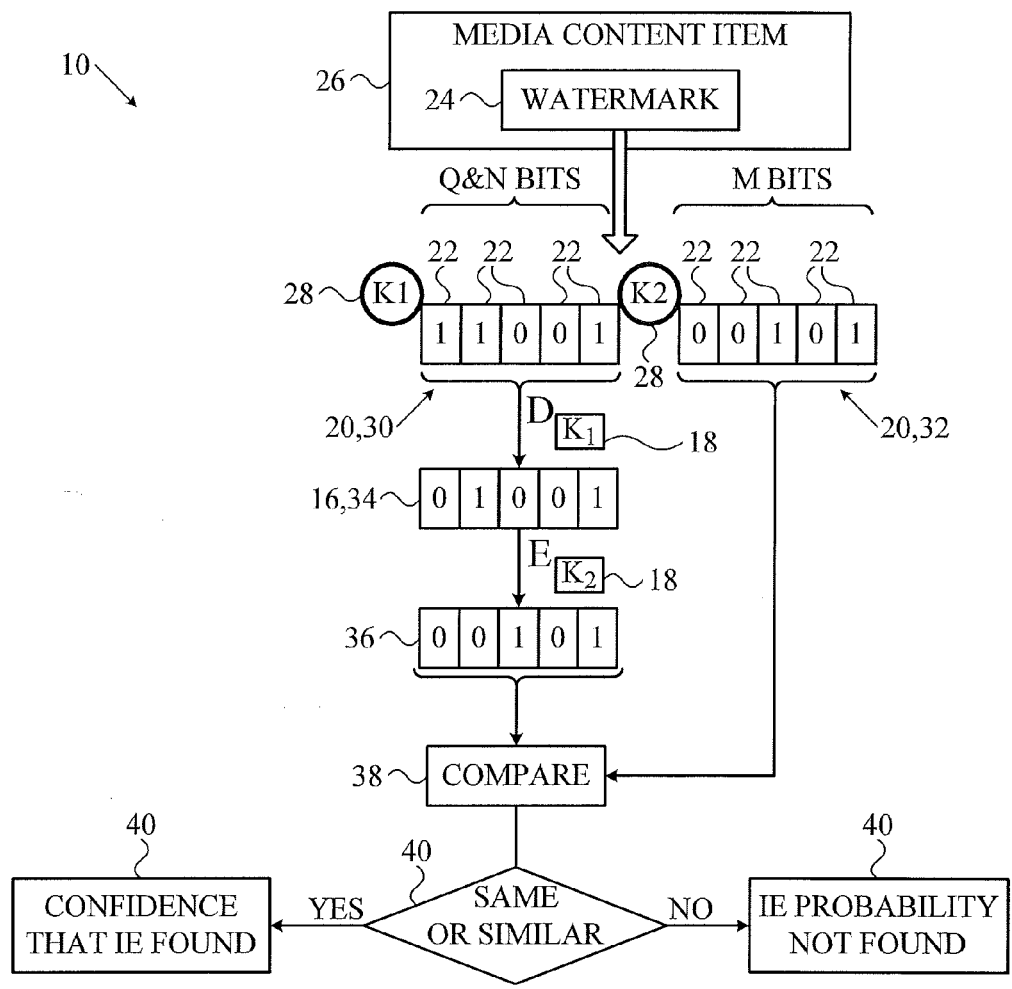
FIG. 3 is a partly pictorial, partly block diagram view of the information element of FIG. 2 being extracted and verified in accordance with a first mode of operation of the system of FIG. 1.

There is provided in accordance with an embodiment of the present invention, a system including a processor, and a memory to store data used by the processor, wherein the processor is operative to receive a media content item including a watermark embedded in the media content item, the watermark encoding a series of encrypted bits deriving from encrypting an information element multiple times such that each of the times the encryption of the information element uses a different one of the cryptographic keys yielding a plurality of encrypted instances of the information element in the series of encrypted bits, the order of the cryptographic keys used in the series of encrypted bits being defined such that an $i^{th}$ encrypted instance of the information element in the series of encrypted bits being encrypted with an $i^{th}$ one of the cryptographic keys $K_i$, the information element consisting of N bits, identify at least part of the watermark in the media content item, extract at least some of the encrypted bits from the at least part of the identified watermark, decrypt a series of N bits using a first one of the cryptographic keys yielding a first value, the series of N bits including Q bits of the encrypted bits as ordered in the series of the encrypted bits and K guessed bits, K being greater than, or equal to, zero, K plus Q equaling N, re-encrypt the first value using a second one of the cryptographic keys yielding a second value, the second cryptographic key being different from the first cryptographic key, and compare at least part of the second value to M bits of the encrypted bits as ordered in the series of the encrypted bits to determine if the at least part of the second value matches the M bits as ordered in the series of the encrypted bits in order to provide a level of confidence that the first value is indeed the information element which was encrypted and embedded as the watermark in the media content item, the Q bits and the M bits being selected from different bits of the encrypted bits, M being greater than zero.

There is also provided in accordance with still another embodiment of the present invention a system including a processor, and a memory to store data used by the processor, wherein the processor is operative to receive a media content item including a watermark embedded in the media content item, the watermark encoding a series of encrypted bits, the encrypted bits deriving from encrypting an information element multiple times with a plurality of cryptographic keys such that each of the times the information element is encrypted with a different one of the cryptographic keys yielding a plurality of encrypted instances of the information element in the series of encrypted bits, the order of the cryptographic keys used in the series of encrypted bits being defined such that an ith encrypted instance of the information element in the series of encrypted bits being encrypted with an ith one of the cryptographic keys Ki, identify at least part of the watermark in the media content item, extract at least some of the encrypted bits from the at least part of the identified watermark, decrypt one of the encrypted instances of the information element using a first one of the cryptographic keys yielding a first value, decrypt a different one of the encrypted instances of the information element using a second one of the cryptographic keys yielding a second value, the second cryptographic key being different from the first cryptographic key, and compare the first value and the second value to determine if the first value matches the second value in order to provide a level of confidence that the first value is indeed the information element which was encrypted and embedded as the watermark in the media content item.

Encoded Versus Encrypted

The term "encoded" is used throughout the present specification and claims, in all of its grammatical forms, to refer to any type of data stream encoding including, for example and without limiting the scope of the definition, watermark encoding and well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
  encoded, but neither scrambled nor encrypted;
  compressed, but neither scrambled nor encrypted;
  scrambled or encrypted, but not encoded;
  scrambled or encrypted, but not compressed;
  encoded, and scrambled or encrypted; or
  compressed, and scrambled or encrypted.

Likewise, the terms "decoded" and "decompressed" on the one hand, and the terms "descrambled" and "decrypted" on the other hand, are used to refer to different and exclusive types of processing.

Description Continued

For the sake of simplicity, the use of the term "watermarking", in all grammatical forms, as used in the specification and claims, is defined to include both digital watermarking and forensic fingerprinting.

A general problem in the field of watermarking is that due to errors in the detection process or a framing attack (whereby users may try to alter the watermark in such a way so as to implicate someone else as illegitimately distributing the content), an innocent consumer/user might be falsely accused of being the leaker. Furthermore, two or more users might collude in order to frame another user.

Reference is now made to FIG. 1, which is a partly pictorial, partly block diagram view of a watermarking system 10 constructed and operative in accordance with an embodiment of the present invention.

The watermarking system 10 typically includes a processor 12 and a memory 14 to store data used by the processor 12. The processor 12 may be used to embed a watermark and/or detect an embedded watermark. The operation of the watermarking system 10 is described in more detail with reference to FIGS. 2-15 below. It should be noted that embedding and detection of the watermark may be performed in to different devices. For example, a watermark may be embedded by a media player operated by a user whereas the same watermark may be detected in a system operated by the content provider or distributor.

The watermarking system 10 may be used to embed any suitable data item or information element as a watermark in any suitable media content item, for example, but not limited to, video, audio, other data or an E-book. The information element may include an ID of the media object owner, an ID of the media object (e.g.: movie ID), an ID of the end-user/subscriber, a timestamp or device ID by way of example only.

Reference is now made to FIG. 2, which is a partly pictorial, partly block diagram view of an information element 16 being encrypted by the watermarking system 10 of FIG. 1.

The information element 16 in typically encoded in a watermark 24 which is embedded in a media content item 26.

The encoding of the information element 16 is now described in more detail.

The processor 12 (FIG. 1) is typically operative to encrypt the information element (reference numeral 16) multiple times using a plurality of cryptographic keys 18 ($K_0$, $K_1$, $K_2$ . . . ) yielding a series of encrypted bits 22 such that, each of the times, the encryption of the information element 16 uses a different one of the cryptographic keys 18 yielding a plurality of encrypted instances 20 of the information element 16 in the series of encrypted bits 22. In other words, each different encrypted instance 20 is produced by the information element 16 being encrypted using a different cryptographic key 18. The order and value of the cryptographic keys 18 used in the series of encrypted bits 22 are known to the watermarking system 10 at the time of embedding and detection of the watermark 24. Apart from knowledge by the watermarking system 10, the cryptographic keys 18 are typically secret. The order of the cryptographic keys 18 used in the series of encrypted bits 22 are defined such that an $i^{th}$ encrypted instance 20 of the information element 16 in the series of encrypted bits 22 is encrypted with an $i^{th}$ one of the cryptographic keys $K_i$. The information element 16 consists of N bits. Therefore, each encrypted instance 20 typically includes N encrypted bits 22, assuming that none of the encrypted bits 22 are missing or corrupted.

The series of encrypted bits 22 (derived from encrypting the information element (reference numeral 16) multiple times as described above) is then encoded as the watermark 24 for embedding into the media content item 26.

The watermark 24 may be imbedded into the media content item 26 using any suitable watermark embedding method. By way of example only, the watermark 24 may be embedded into video by modifying the colors and/or the brightness of certain parts of the video. By way of another example, the watermark 24 may be embedded into an e-book by modifying the character and/or line spacing.

The watermark 24 is typically embedded in such a way that the watermarking system 10 typically expects encrypted bits 22 to be embedded in particular regions of the media content item 26, so that if during detection of the watermark 24 one or more of the particular regions is missing (e.g. a video frame is missing), certain bit(s) 22 of the embedded watermark 24 may also be missing.

Similarly, if during detection of the watermark 24, the system 10 cannot make a determination whether an encrypted bit 22 embedded in the watermark 24 is a 0 or a 1 then that bit 22 will be treated as a "corrupted" bit 22, described in more detail below. For example, if a 0 is encoded as a brightness value less than a first value and a 1 is encoded as a brightness value above a second value and the region where you expect there to be an encrypted bit 22 encoded therein does not fit the criteria for a 0 or a 1 you then have a "corrupted" bit 22.

Since the cryptographic keys 18 are typically secret and unknown to an adversary, the adversary cannot easily produce fingerprinting for any information element 16 and therefore cannot easily frame another user. Furthermore, repeating the encryption of the information element 16 with different keys 18 typically enables verification of the extracted information element 16 as will be described below in more detail with reference to FIGS. 3-13.

It should be noted that the set of cryptographic keys 18 may be unique per media content item 26 or used again for a plurality of media content items 26.

Additionally, each of the cryptographic keys 18 within the set of cryptographic keys 18 is typically, but not necessarily, unique.

Each of the cryptographic keys 18 may include a corresponding encryption key and decryption key to enable asymmetric encryption/decryption.

Alternatively, each of the cryptographic keys 18 may be a symmetric cryptographic key used in both encryption and decryption.

It should be further noted that the watermark 24 may be embedded in the media content item 26 using any suitable watermark embedding method as known to one ordinarily skilled in the art of watermarking.

Any suitable cipher may be used to perform the encryption function of the watermarking system 10, for example, but not limited to, AES-128, triple DES or a proprietary block cipher. The block size may be any suitable value, for example but not limited to, 32, 64 or 128 bits. The cryptographic key size may be any suitable value, for example, but not limited to, 112 or 128 bits. The information element 16 may be any suitable size, but a typical ID may include 32 bits or 64 bits.

Reference is now made to FIG. 3, which is a partly pictorial, partly block diagram view of the information element 16 of FIG. 2 being extracted and verified in accordance with a first mode of operation of the system 10 of FIG. 1.

The processor 12 (FIG. 1) receives the media content item 26 including the watermark 24 embedded therein. The processor 12 is then operative to identify at least part of the watermark 24 in the media content item 26 and extract at least some of the encrypted bits 22 from the identified (part of) the watermark 24. The watermark 24 may include one or more indicators 28 to indicate positioning of each of the encrypted instances 20 of the information element 16 within the watermark 24 and which ones of the cryptographic keys 18 were used to encrypt each of the encrypted instances 20.

Figure 4:
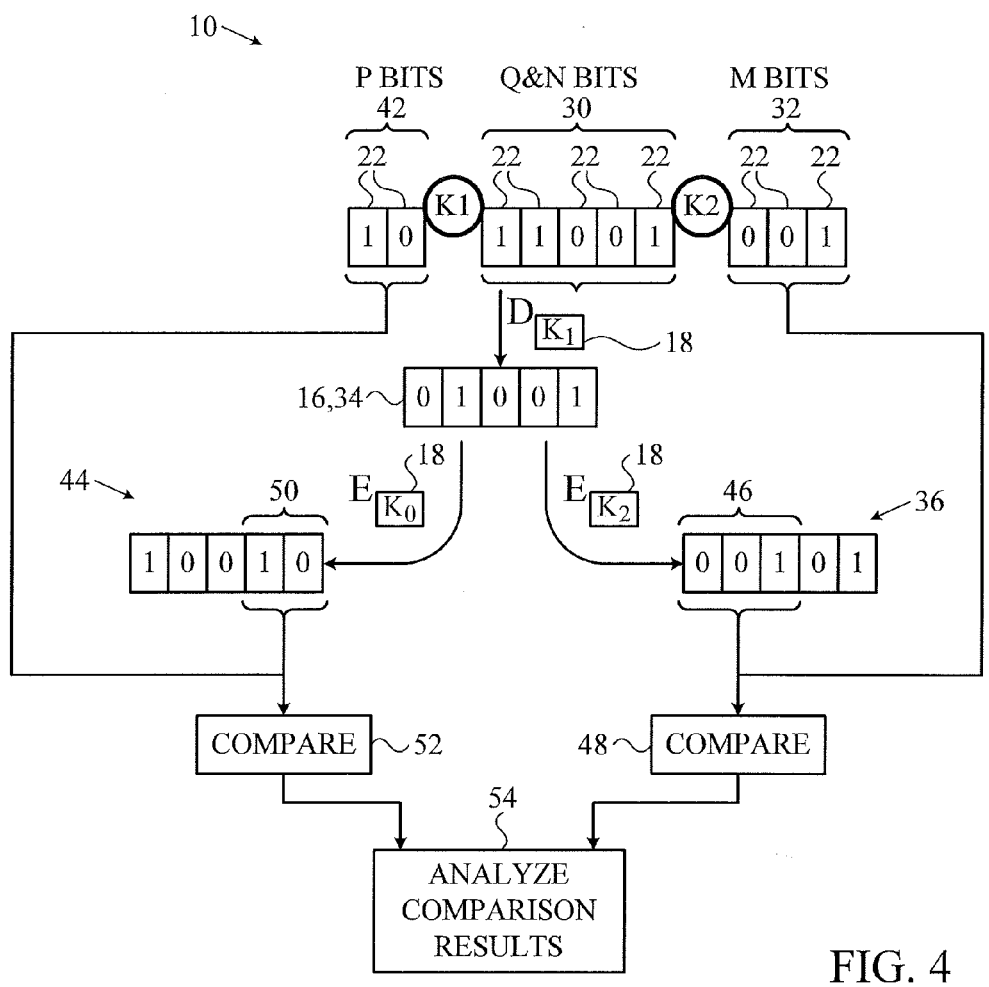
FIG. 4 is a partly pictorial, partly block diagram view of the information element of FIG. 2 being extracted and verified in accordance with a second mode of operation of the system of FIG. 1.

In the detection phase, the watermarking system 10 typically acquires a portion of the series of encrypted bits 22 including at least one whole encrypted instance 20 of the information element 16. If the acquired series of encrypted bits 22 is twice the length of the information element 16, the acquired series of encrypted bits 22 includes at least one whole encrypted instance 20 of the information element 16 and either another whole encrypted instance 20 of the information element 16 (as shown in the example of FIG. 3) or two partial encrypted instances 20 of the information element 16 (as shown in the example of FIG. 4). The acquired portion of the series of encrypted bits 22 may include missing or corrupted encrypted bits as described above. The treatment of missing or corrupted bits is described in more detail with reference to FIGS. 6 and 7.

The example of FIG. 3 assumes that the acquired portion of the series of encrypted bits 22 includes two whole encrypted instances 20 of the information element 16 without any missing or corrupted bits.

In overview, the information element 16 is extracted from one of the encrypted instances 20 (an encrypted instance 30) in the acquired portion of the series of encrypted bits 22 and verified against another one of the encrypted instances 20 (an encrypted instance 32) in the acquired portion of the series of encrypted bits 22.

The extraction and verification process is now described in more detail below.

The processor 12 (FIG. 1) is typically operative to decrypt a series of N bits using a $j^{th}$ one of the cryptographic keys 18 ($K_1$ in the example of FIG. 3) yielding a value 34. The index j is an integer value. In the example of FIG. 3, the series of N bits corresponds to the encrypted bits of the encrypted instance 30. As a generalization, the series of N bits includes Q bits from the series of encrypted bits 22 as ordered in the series of the encrypted bits 22 and may include K guessed bits. Guessed bits (K) are typically present when one or more of the encrypted bits 22 expected to be in the watermark 24 is missing or corrupted and therefore the missing/corrupted data is replaced by guessed data. So for example, a missing bit may be assumed to be a 1 or a 0. Missing and corrupted bits are described in more detail with reference to FIGS. 6 and 7 where K is greater than, or equal to, one. In the example of FIG. 3, K is equal to zero (i.e.: no guessed bits). In general, K plus Q equals N. The cryptographic key 18 used to perform the decryption is chosen based either on the cryptographic keys 18 known to have been used, or estimated to have been used, to encrypt the Q bits.

The processor 12 (FIG. 1) is then typically operative to re-encrypt the value 34 using another one of the cryptographic keys 18 ($K_2$ in the example of FIG. 3) yielding a value 36. When the encrypted instance 30 and the encrypted instance 32 are adjacent to each other in the series of encrypted bits 22 (as in the example of FIG. 3), the cryptographic key 18 used to re-encrypt the value 34 will either be the $j+1^{th}$ or the $j-1^{th}$ one of the cryptographic keys 18 depending on where the encrypted instance 32 is positioned in relation to the encrypted instance 30 (i.e. to the left or right of the encrypted instance 30).

The processor 12 (FIG. 1) is then typically operative to compare the value 36 to the encrypted bits 22 of the encrypted instance 32 as ordered in the series of the encrypted bits 22 (block 38) to determine if at least part of the value 36 matches the bits of the encrypted instance 32 as ordered in the series of the encrypted bits 22 in order to provide a level of confidence that the value 34 is indeed the information element (IF) 16 which was encrypted and embedded as the watermark 24 in the media content item 26 (blocks 40).

The above comparison procedure may be generalized as follows. The processor 12 (FIG. 1) is typically operative to compare at least part of the value 36 to M bits of the encrypted bits 22 as ordered in the series of the encrypted bits 22 to determine if at least part of the value 36 matches the M bits as ordered in the series of the encrypted bits 22 in order to provide a level of confidence that the value 34 is indeed the information element 16 which was encrypted and embedded as the watermark 24 in the media content item 26.

In the example of FIG. 3 the value 36 (bits "00101") is compared to the M bits (bits "00101") to determine if the value 36 and the M bits match.

In the example of FIG. 3, M is equal to N, in which the M bits correspond to the N bits of the encrypted instance 32. If the encrypted instance 32 includes one or more missing or corrupted bits, then the value M will be less than N, and the missing or corrupted bits will be treated as wildcards for matching purposes. So for example if the middle bit 22 of the encrypted instance 32 is missing or corrupted, the encrypted instance 32 will be represented by "00?01" where "?" is a wildcard. Then only 4 of the bits of the value 36, namely the first two bits "00" and the last two bits "01", are compared to the M bits comprising the first two bits "00" of the encrypted instance 32 and the last two bits "01" of the encrypted instance 32, respectively. In other words, each of the four bits (the first two and the last two bits) of the value 36 is individually compared with a corresponding bit (having the same bit position) in the encrypted instance 32. If all of the compared bits match, then the information element 16 has been verified. However, if even one of the M bits does not match the value 36 based on the above comparison, the information element 16 has not been verified. The treatment of missing or corrupted bits is described in more detail with reference to FIGS. 6 and 7.

The cryptographic key 18 used to perform the re-encryption of value 34 is chosen based either on the cryptographic key 18 known to have been used, or estimated to have been used, to initially encrypt the M bits when the watermark 24 was created.

The Q bits and the M bits are selected from different bits of the encrypted bits 22. In the example of FIG. 3, the Q bits and the M bits are positioned in the series of encrypted bits 22 in adjacent encrypted instances 20 (the encrypted instance 30 and the encrypted instance 32, respectively) of the information element 16.

It will be appreciated that the value of M is greater than zero. The typical values of M are discussed in more detail with reference to FIG. 4. However, in general, the value M is typically large enough to provide the necessary level of confidence in verifying the information element 16.

Instead of re-encrypting the value 34 yielding the value 36 and comparing the M bits to the value 36, the following may be performed instead. The processor 12 (FIG. 1) is operative to decrypt a different one of the encrypted instances 20 (the encrypted instance 32 in the example of FIG. 3) of the information element 16 using another one of the cryptographic keys 18 ($K_2$ in the example of FIG. 3) yielding a second value (not shown in FIG. 3). The processor 12 (FIG. 1) is then operative to compare the value 36 and the second value to determine if the value 36 matches the second value in order to provide a level of confidence that the value 36 is indeed the information element 16 which was encrypted and embedded as the watermark 24 in the media content item 26.

Reference is now made to FIG. 4, which is a partly pictorial, partly block diagram view of the information element 16 of FIG. 2 being extracted and verified in accordance with a second mode of operation of the system 10 of FIG. 1.

FIG. 3 showed the example of verifying one of the encrypted instances 20, the encrypted instance 30, against a whole encrypted instance 20, the encrypted instance 32. FIG. 4 shows an example of verifying one of the encrypted instances 20, the encrypted instance 30, with two partial encrypted instances 20, part of the encrypted instance 32 and part of an encrypted instance 42.

The processor 12 (FIG. 1) is operative to decrypt the series of N bits using a $j^{th}$ one of the cryptographic keys 18 ($K_1$ in the example of FIG. 4) yielding the value 34. In the example of FIG. 4, the series of N bits corresponds to the N encrypted bits of the encrypted instance 30. As a generalization, the series of N bits includes Q bits from the series of encrypted bits 22 as ordered in the series of the encrypted bits 22 and may include K guessed bits. In the example of FIG. 4, K is equal to zero (i.e.: no guessed bits). The cryptographic key 18 used to perform the decryption is chosen based either on the cryptographic key 18 known to have been used, or estimated to have been used, to encrypt the Q bits.

The processor 12 (FIG. 1) is then typically operative to re-encrypt the value 34 using another one of the cryptographic keys 18 ($K_2$ in the example of FIG. 4) yielding the value 36.

Additionally, the processor 12 (FIG. 1) is typically operative to re-encrypt the value 34 using yet another one of the cryptographic keys 18 ($K_0$ in the example of FIG. 4) yielding a value 44.

When the encrypted instance 42 and the encrypted instance 32 are positioned either side of the encrypted instance 30, the cryptographic key 18 used to re-encrypt the value 34 is the $j+1^{th}$ cryptographic key 18 (associated with the encrypted instance 32) and the other cryptographic key 18 used to re-encrypt the value 34 is the j–1$^{th}$ cryptographic key 18 (associated with the encrypted instance 42). It will be appreciated by one ordinarily skilled in the art that the partial encrypted instances 20 used to verify the value 36 do not need to be adjacent to the encrypted instance 30.

The processor 12 (FIG. 1) is operative to compare a part 46 of the value 36 to some of the encrypted bits 22 (termed M bits) of the encrypted instance 32 as ordered in the series of the encrypted bits 22 (block 48) to determine if at least part of the part 46 of the value 36 matches the M bits of the encrypted instance 32 as ordered in the series of the encrypted bits 22 in order to provide a level of confidence that the value 34 is indeed the information element 16 which was encrypted and embedded as the watermark 24 (FIG. 2) in the media content item 26 (FIG. 2). The position of the bits (the part 46) of the value 36 used for comparison with the M bits are selected to have the same position in the value 36 as the M bits have in the encrypted instance 32.

In the example of FIG. 4 the last first 3 bits of the value 36 (bits "001") are compared to the M bits (bits "001") to determine if the part 46 of the value 36 and the M bits match.

The processor 12 (FIG. 1) is also operative to compare a part 50 of the value 44 to some of the encrypted bits 22 (termed P bits) of the encrypted instance 42 as ordered in the series of the encrypted bits 22 (block 52) to determine if at least part of the part 50 of the value 44 matches the P bits of the encrypted instance 42 as ordered in the series of the encrypted bits 22 in order to provide a further level of confidence that the value 34 is indeed the information element (IE) 16 which was encrypted and embedded as the watermark 24 in the media content item 26. The position of the bits (the part 50) of the value 44 used for comparison with the P bits are selected to have the same position in the value 44 as the P bits have in the encrypted instance 42.

In the example of FIG. 4 the last two bits of the value 44 (bits "10") are compared to the P bits (bits "10") to determine if the part 50 of the value 44 and the P bits match. The processor 12 (FIG. 1) typically analyzes the comparison results from the block 48 and the block 52 in order to provide a combined level of confidence that the value 34 is indeed the information element 16 which was encrypted and embedded as the watermark 24 (FIG. 2) in the media content item 26 (FIG. 2) (block 54).

If any of the bits 22 of the encrypted instance 32 or the encrypted instance 42 are missing or corrupted, the missing bit(s) will be treated as a wildcard(s) as described above with reference to FIG. 3. Each of the known bits (M bits) in the encrypted instance 32 is then individually compared with a corresponding bit (having the same bit position) in the value 36 and each of the known bits (P bits) in the encrypted instance 42 is individually compared with a corresponding bit (having the same bit position) in the value 44. If all the compared bits match then the information element 16 has been verified. However, if even one of the M bits or P bits does not match the corresponding bits in the value 36 or the value 44, respectively, then the information element 16 has not been verified.

The cryptographic keys 18 used to perform the re-encryption of value 34 is chosen based either on the cryptographic keys 18 known to have been used, or estimated to have been used, to initially encrypt the M bits and the P bits when the watermark 24 (FIG. 2) was created.

The Q bits, the M bits and the P bits are selected from different bits of the encrypted bits 22. In other words, the Q, M and P bits are chosen such that they do not overlap each other in the series of encrypted bits 22.

Additionally, the M bits and the P bits correspond to different parts of the information element 16. In the example of FIG. 4, the M bits correspond to the first three bits of the information element 16 when encrypted and the P bits correspond to the last two bits of the information element 16 when encrypted.

In the example of FIG. 4, M plus P is equal to N. If any of the parts of the encrypted instance 32 or the encrypted instance 42 compared to the part 46 of the value 36 and the part 50 of the value 44, respectively, includes one or more missing or corrupted bits, then M plus P will typically be less than N. The example of missing bits is described in more detail with reference to FIGS. 6 and 7.

In the example of FIG. 4, the M bits and the P bits are positioned in the encrypted instances 20 (the encrypted instance 32 and the encrypted instance 42) which are either side of the encrypted instance 30 which includes the Q bits.

N, K, M and P may have any suitable values. A suitable value for N may be 32 or 64 by way of example only. A suitable value for K may be 0 or any suitable small positive number for example, but not limited to, 1 to 10. It should be noted that the values of N, K, M and P may be limited so that it is easy to enumerate on 2K values so K could be larger than 10 as long as K is significantly less (as understood by one ordinarily skilled in the art) than M plus P. In other words the K "guessed" bits typically need to be significantly less in number than the known bits of M plus P, M plus P is equal to N or less than N. M plus P is typically at least 16, but could have any suitable value.

If the above processing of FIG. 3 or FIG. 4 does not yield a suitable match to the M bits and/or P bits for verifying the information element 16, it may be possible that one or more of the encrypted bits 22 of the Q, M or P bits may have an incorrect value or values. The watermarking system 10 may assume that there is a 1-bit error somewhere in the data. The watermarking system 10 flips one of the bits (of the Q or M or P bits) and performs the decryption, re-encryption and matching steps. If the relevant bits match then the information element 16 has been verified, if not the watermarking system 10 flips a different bit, and so on until the relevant bits match. If the above processing still does not produce a match, the watermarking system 10 may assume that there is a 2-bit error somewhere in the data. The watermarking system 10 flips two of the bits (of the Q or M or P bits) and performs the decryption, re-encryption and matching steps and so on trying all two-bit combinations until a match is found. If the two-bit approach does not provide a match then the watermarking system 10 could assume a 3-bit error and so on. The process is typically limited by computational complexity and the need to provide results with a high enough degree of confidence.

Therefore, the above method may be repeated trying different values (each time with one or two or so different values for different ones of the bits 22 of the Q and/or M and/or P bits) until a suitable match to the M bits and P bits is found. Processing of missing and corrupted bits 22 is described in more detail below with reference to FIGS. 6 and 7.

Figure 5:
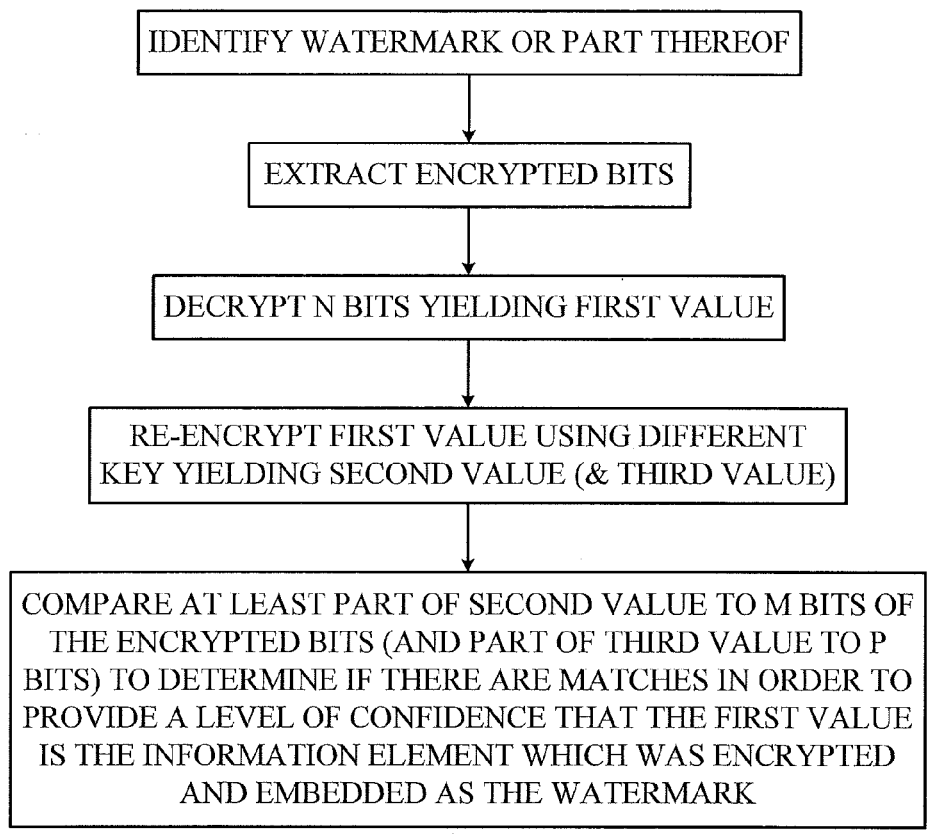
FIG. 5 is a flow chart of a method of operation of the watermarking system of FIG. 1.

Reference is now made to FIG. 5, which is a flow chart of a method of operation of the watermarking system 10 of FIG. 1.

In practice, some or all of these functions may be combined in a single physical component or, alternatively, implemented using multiple physical components. These physical components may comprise hard-wired or programmable devices, or a combination of the two. In some embodiments, at least some of the functions may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

Figure 6:
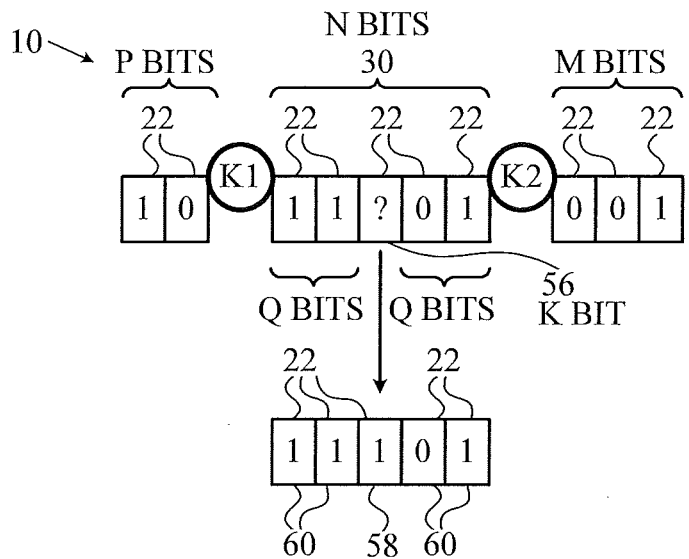
FIG. 6 is a partly pictorial, partly block diagram view of a series of encrypted bits with an error in one encrypted instance of the information element of FIG. 2 being processed in the system of FIG. 1.

Reference is now made to FIG. 6, which is a partly pictorial, partly block diagram view of the series of encrypted bits 22 with an error 56 in the encrypted instance 30 of the information element 16 of FIG. 2 being processed in the system 10 of FIG. 1.

The information element 16 can still be extracted and verified with some degree of confidence even if there are one or more bits of the series of encrypted bits 22 in the encrypted instance 30 that are missing or corrupted. In other words the information element 16 can still be extracted and verified with some degree of confidence even if K is greater than zero.

Obviously, the degree of confidence will reduce as the number of missing bits increases. The exact degree of confidence is given by M plus P minus K and needs to be positive.

If there are one or more bits of the encrypted instance 30 which are missing or corrupted, the value of the missing bits can be guessed and the method described above with reference to FIGS. 3 and 4 can be performed based on the Q known bits 60 of the encrypted instance 30 and the K guessed bits 58, where K plus Q is equal to N. The method can be performed again and again with different guessed values for the missing bits until a match with the M bits and P bits is found. So for example, in the case of one missing bit, the watermarking system 10 could assume that the missing bit is a zero, and then perform the decryption and re-encryption steps based on that guess and then check for matches. If the relevant bits do not match, the watermarking system 10 could assume that the missing bit is a one, and then perform the decryption and re-encryption steps based on that second guess and then check for matches. If neither guess provides a match, then the watermarking system 10 could perform more trial and error processing by flipping 1 bit in different positions, then 2 bits in different positions, as described above.

Figure 7:
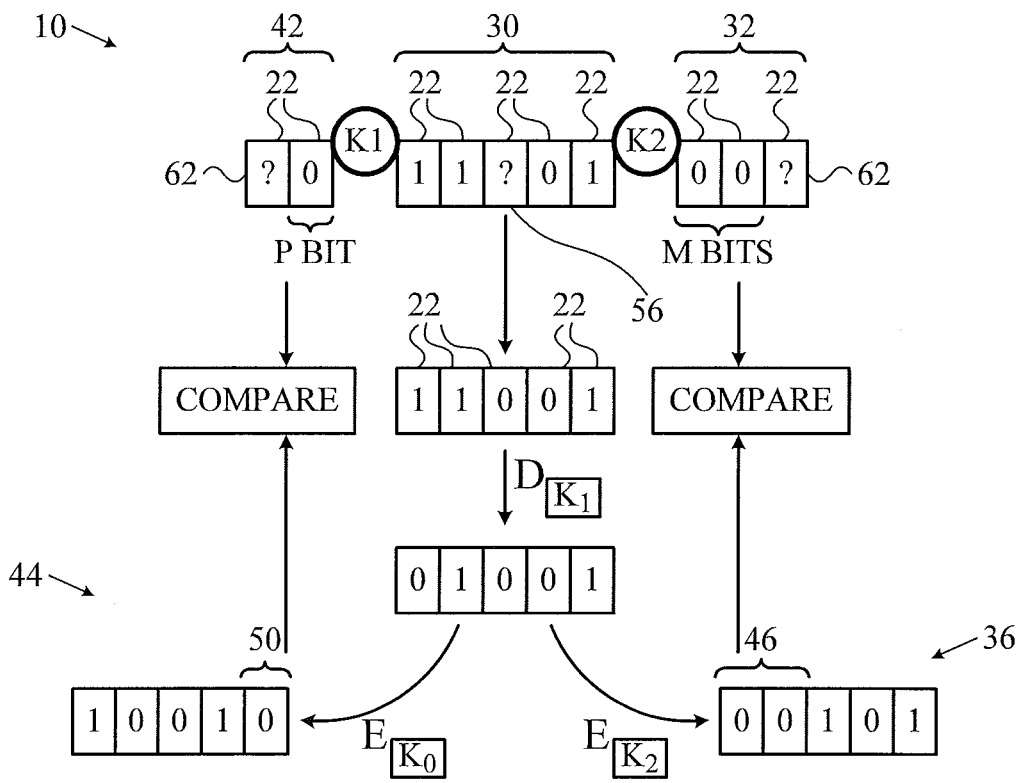
FIG. 7 is a partly pictorial, partly block diagram view of a series of encrypted bits with an error in more than one encrypted instance of the information element of FIG. 2 being processed in the system of FIG. 1.

Reference is now made to FIG. 7, which is a partly pictorial, partly block diagram view of the series of encrypted bits 22 with an error 62 in more than one encrypted instance 20 of the information element 16 of FIG. 2 being processed in the system 10 of FIG. 1.

In addition to having the error 56 in the encrypted instance 30, FIG. 7 shows that there is also an error 62 in the bits 22 of the encrypted instance 32 and the encrypted instance 42. The missing bits of the encrypted instance 42 and the encrypted instance 32 are ignored when comparing the part of the encrypted instance 42 to the part 50 of the value 44 and the part of the encrypted instance 32 to the part 46 of the value 36.

In the example of FIG. 7, it will be appreciated that M plus P is less than N as not all the bits 22 of the encrypted instance 42 and the encrypted instance 32 are used in the comparison stage as not all the bits are known.

Figure 8:
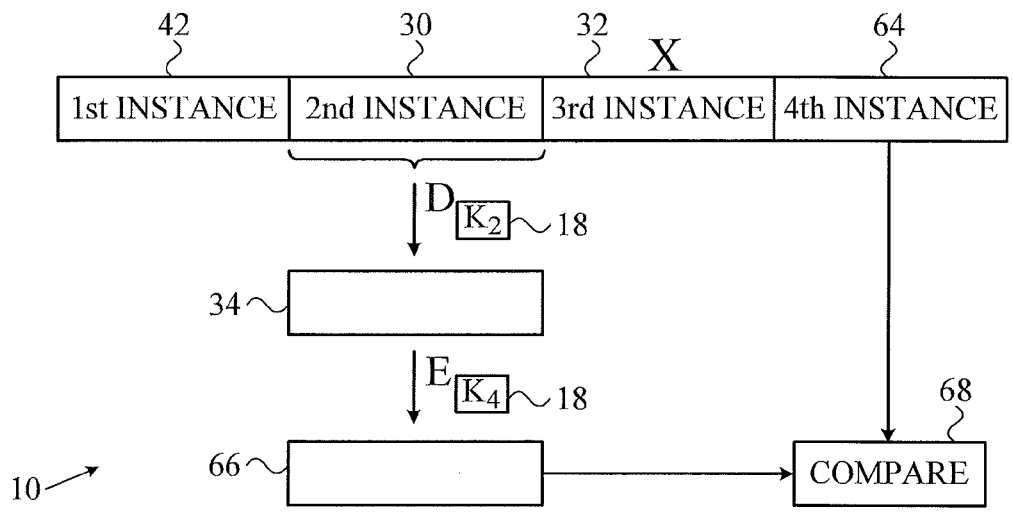
FIG. 8 is a partly pictorial, partly block diagram view of the system of FIG. 1 verifying the information element of FIG. 2 based on a non-adjacent encrypted instance of the information element.

Reference is now made to FIG. 8, which is a partly pictorial, partly block diagram view of the system 10 of FIG. 1 verifying the information element 16 of FIG. 2 based on a non-adjacent encrypted instance 64 of the information element 16.

The encrypted instance 30 is decrypted to yield the value 34, as described above with reference to FIG. 3. However, when the value 34 is re-encrypted, the value 34 is re-encrypted with the cryptographic key 18 ($K_4$ in the example of FIG. 8) associated with the encrypted instance 64 to yield a value 66 which is compared to the encrypted instance 64 (block 68). The above may be useful when not enough of the data of the adjacent encrypted instances 32, 42 is available or the data of the encrypted instance 64 is more complete than the data of the adjacent encrypted instances 32, 42.

Figure 9:
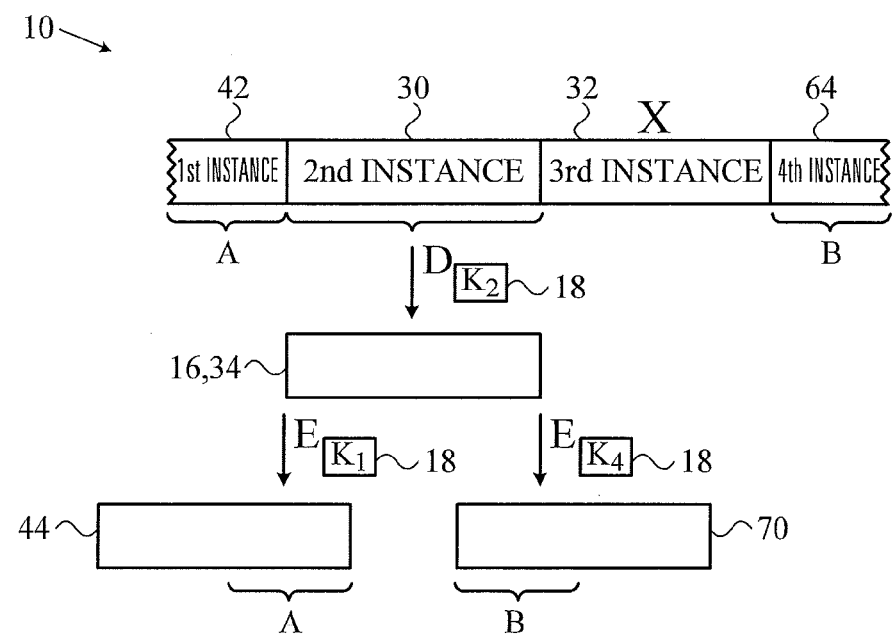
FIG. 9 is a partly pictorial, partly block diagram view of the system of FIG. 1 verifying an information element based partially on a non-adjacent encrypted instance of the information element of FIG. 2 and partially on an adjacent encrypted instance of the information element.

Reference is now made to FIG. 9, which is a partly pictorial, partly block diagram view of the system 10 of FIG. 1 verifying the information element 16 based partially on the non-adjacent encrypted instance 64 of the information element 16 of FIG. 2 and partially on an adjacent encrypted instance 42 of the information element 16.

The value 34 is re-encrypted using the cryptographic key 18 for the encrypted instance 42 to yield the value 44 as described with reference to FIG. 4.

The value 34 is also re-encrypted using the cryptographic key 18 for the encrypted instance 64 to yield a value 70. A part B of the value 70 is compared to a part B of the encrypted instance 64 and part A of the value 44 is compared to part A of the encrypted instance 42 in order to provide a level of confidence that the value 34 is indeed the information element 16 encrypted and embedded in the watermark 24 (FIG. 2).

The above may be useful when not enough of the data of the adjacent encrypted instance 32 is available (due to missing or corrupted bits) or the data of the encrypted instance 64 is more complete than the data of the adjacent encrypted instance 32 so even though the encrypted instance 64 may include one or more missing or corrupted bits, the encrypted instance 64 include less missing or corrupted bits than the encrypted instance 32.

Figure 10:
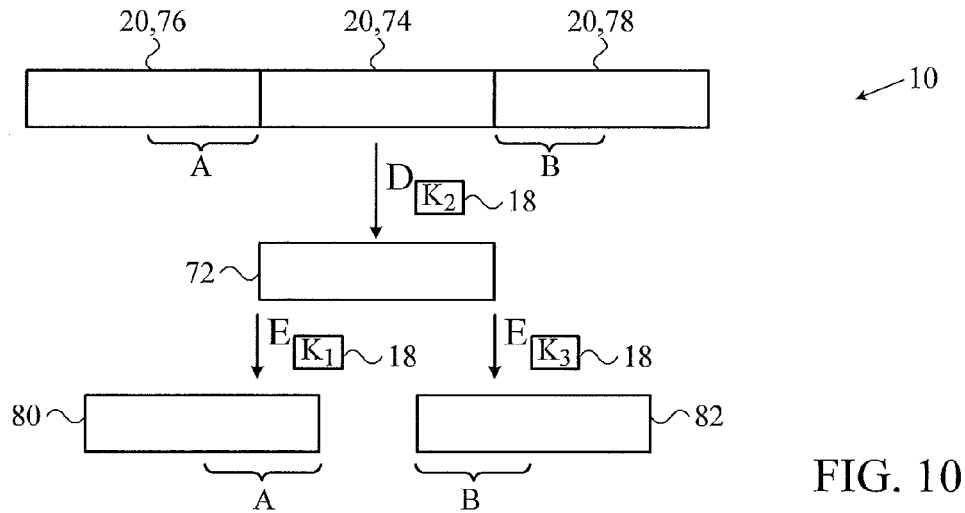
FIG. 10 is a partly pictorial, partly block diagram view of the system of FIG. 1 verifying the information element of FIG. 2 based on trial and error with a cryptographic key.

Reference is now made to FIG. 10, which is a partly pictorial, partly block diagram view of the system 10 of FIG. 1 verifying the information element 16 of FIG. 2 based on trial and error with different cryptographic keys 18.

When the media content item 26 (FIG. 2) does not indicate which of the cryptographic keys 18 were used to encrypt the encrypted instances 20 of the information element 16 (FIG. 2), the watermarking system 10 needs to guess which of the cryptographic keys 18 were used to encrypt the encrypted instances 20 in question and the extraction and verification needs to be performed on a trial and error basis with the different cryptographic keys 18.

FIG. 10 shows an encrypted instance 74, being decrypted with cryptographic key $K_2$ yielding a value 72. The use of the cryptographic key $K_2$ in the decryption process is based on a guess of which of the cryptographic keys 18 was used initially to encrypt the information element 16 (FIG. 2) as the encrypted instance 74.

The information element 16 extracted as the value 72 is then verified against two adjacent encrypted instances 20, an encrypted instance 76 and an encrypted instance 78. The value 72 is re-encrypted with the cryptographic key $K_1$ and $K_3$ yielding a value 80 and a value 82, respectively. $K_1$ and $K_3$ were chosen for the re-encryption as it is known that $K_1$ and $K_3$ are both adjacent to $K_2$.

The part A of the value 80 is compared to the part A of the encrypted instance 76 and the part B of the value 82 is compared to the part B of the encrypted instance 78.

Figure 11:
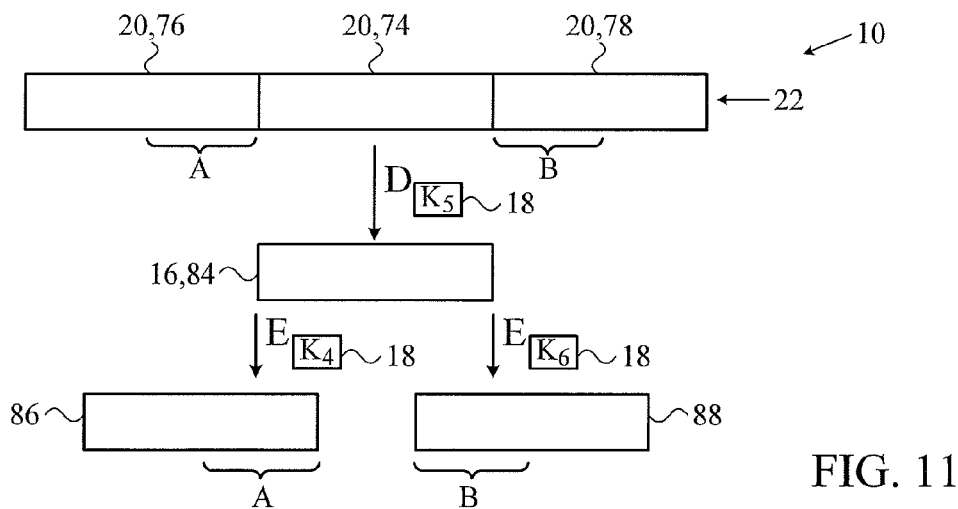
FIG. 11 is a partly pictorial, partly block diagram view of the system of FIG. 1 verifying the information element of FIG. 2 based on trial and error with a different cryptographic key.

Reference is now made to FIG. 11, which is a partly pictorial, partly block diagram view of the system 10 of FIG. 1 verifying the information element 16 of FIG. 2 based on trial and error with different cryptographic keys 18.

The procedure described above with reference to FIG. 10 is now repeated using a different cryptographic key 18 ($K_5$) to decrypt the encrypted instance 74 yielding a value 84. Cryptographic keys $K_4$ and $K_6$ are now chosen to re-encrypt the decrypted value 84 yielding a value 86 and a value 88, respectively.

Different cryptographic keys 18 are tried until the information element 16 (FIG. 2) is successfully extracted and verified by finding a match to the M (and the P bits).

Therefore, when the media content item 26 (FIG. 2) does not indicate which of the cryptographic keys 18 were used to encrypt the encrypted instances 20 of the information element 16 (FIG. 2), the processor 12 (FIG. 1) is operative, via a process of trial and error, to perform: (i) the decryption of the series of N bits (Q bits from the series of encrypted bits 22 as ordered in the series of the encrypted bits 22 and K guessed bits, K being zero or greater) yielding the value 84; and (ii) the re-encryption of the value 84 yielding the values 86, 88; and (iii) the comparison of part B of the value 88 to the M bits (part B of the encrypted instance 78) and part A of the value 86 to the P bits (part A of the encrypted instance 76) using different combinations of the cryptographic keys 18 until it is determined that the M bits match corresponding bits of part B (being at least part of part B) of the value 88 as ordered in the series of the encrypted bits 22 and that the P bits match corresponding bits of part A (being at least part of part A) of the value 86 as ordered in the series of the encrypted bits 22.

It should be noted that when the encrypted instances 20 used to verify the decrypted encrypted instance 74 are adjacent to, and either side of, the encrypted instance 74 (as shown in FIG. 11) and the cryptographic key 18 chosen to decrypt the encrypted instance 74 is $K_j$, the cryptographic keys 18 used to re-encrypt the decrypted value 84 will be chosen to be $K_{j-1}$ and $K_{j+1}$. In such a case, the processor 12 (FIG. 1) is operative, via a process of trial and error, to perform the steps (i), (ii) and (iii) using different values of j until it is determined that at least part of part B of the value 88 matches the M bits as ordered in the series of the encrypted bits 22 and that the at least part of part A of the value 86 matches the P bits as ordered in the series of the encrypted bits 22.

The above case of lack of knowledge of the cryptographic keys 18 described with reference to FIGS. 10 and 11 describes verifying the information element 16 using two partial adjacent encrypted instances 20. It will be appreciated by one ordinarily skilled in the art that the process of trial and error using different cryptographic keys 18 may be performed for non-adjacent partial encrypted instances 20 as well as verifying the information element 16 based on a whole encrypted instance 20 which is adjacent or non-adjacent to the encrypted instance 20 of the information element 16 being verified.

Figure 12:
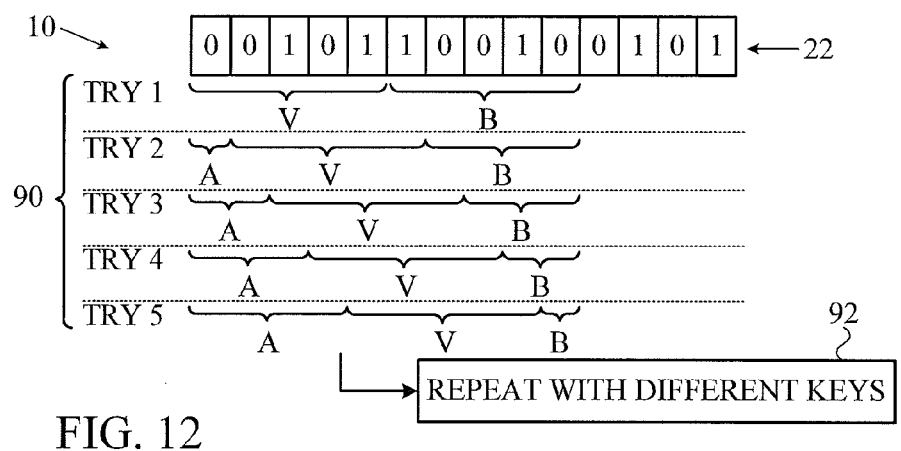
FIG. 12 is a partly pictorial, partly block diagram view of the system of FIG. 1 trying different positions within a series of encrypted bits in order to extract and verify the information element of FIG. 2.

Reference is now made to FIG. 12, which is a partly pictorial, partly block diagram view of the system 10 of FIG. 1 trying different positions within the series of encrypted bits 22 in order to extract and verify the information element 16 of FIG. 2.

If the position of the encrypted instances 20 (FIG. 2) of the information element 16 (FIG. 2) in the encrypted bits 22 extracted from the identified watermark 24 (FIG. 2) is unknown, various positions V in the series of encrypted bits 22 need to be tried. At each position V, the process is repeated with different cryptographic keys 18 (FIG. 2). The above trial and error is repeated until the information element 16 is successfully extracted and verified.

FIG. 12 shows various tries 90 at extracted and verifying the information element 16 (FIG. 2), each try trying a different position V which guesses the position of one of the encrypted instances 20 (FIG. 2) in the series of encrypted bits 22 from which to extract the information element 16 and comparing the decrypted value 34 (FIGS. 3, 4) of the possible encrypted instance V to parts A and B of possible adjacent encrypted instances 20.

Therefore, when the positioning of the encrypted instances 20 (FIG. 2) in the series of encrypted bits 22 is unknown, the processor 12 (FIG. 1) is operative, by a process of trial and error, to perform the decryption of the series of N bits (part V in FIG. 12) and the re-encryption of the value 34 (FIGS. 3, 4) and the comparison of the part 46 (FIGS. 3, 4) of the value 36 (FIGS. 3, 4) to the M bits (part B in FIG. 12) and the part 50 (FIGS. 3, 4) of the value 44 (FIGS. 3, 4) to the P bits (part A in FIG. 12) based on different positions of the series of N bits (part V in FIG. 12), the M bits (part B in FIG. 12) and the P bits (part A in FIG. 12) within the series of encrypted bits 22 until it is determined that at least part of the part 46 (FIGS. 3, 4) of the value 36 (FIGS. 3, 4) matches the M bits and at least part of the part 50 (FIGS. 3, 4) of the value 44 (FIGS. 3, 4) matches the P bits as ordered in the series of the encrypted bits 22. As part of the above process, the processor 12 (FIG. 1) is operative to perform the trial and error processing with different ones of the cryptographic keys 18 (FIG. 2) for each of the positions V until the information element 16 is successfully extracted and verified (block 92).

Figure 13:
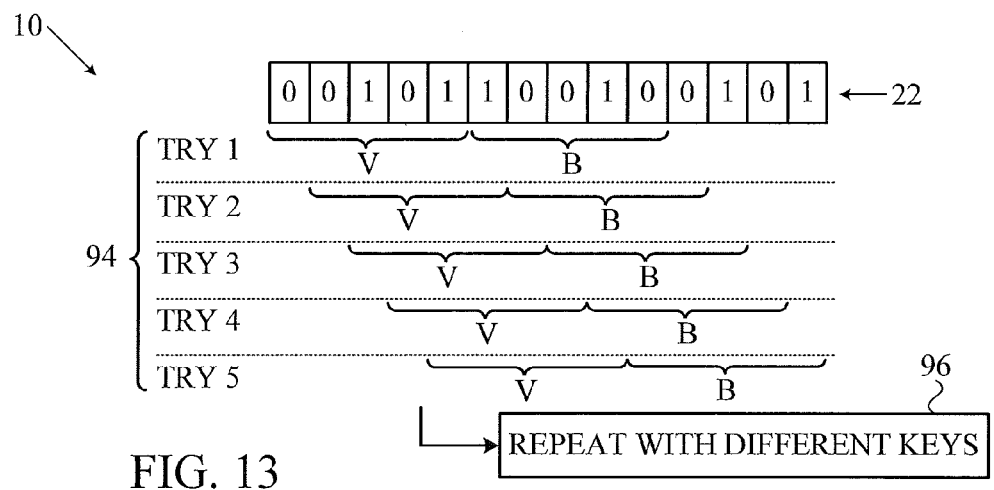
FIG. 13 is a partly pictorial, partly block diagram view of the system of FIG. 1 trying different positions within a series of encrypted bits in order to extract and verify the information element of FIG. 2 against a single adjacent encrypted instance of the information element.

Reference is now made to FIG. 13, which is a partly pictorial, partly block diagram view of the system 10 of FIG. 1 trying different positions V within the series of encrypted bits 22 in order to extract and verify the information element 16 of FIG. 2 against a single adjacent "possible" encrypted instance B of the information element 16.

FIG. 13 shows a number of tries 94 for position V and B. At each position the process is repeated for different ones of the cryptographic keys 18 (block 96). In FIG. 13 the "possible" position V of an encrypted instance of the information element 16 (FIG. 2) is verified by a "possible" whole adjacent encrypted instance B.

Figure 14:
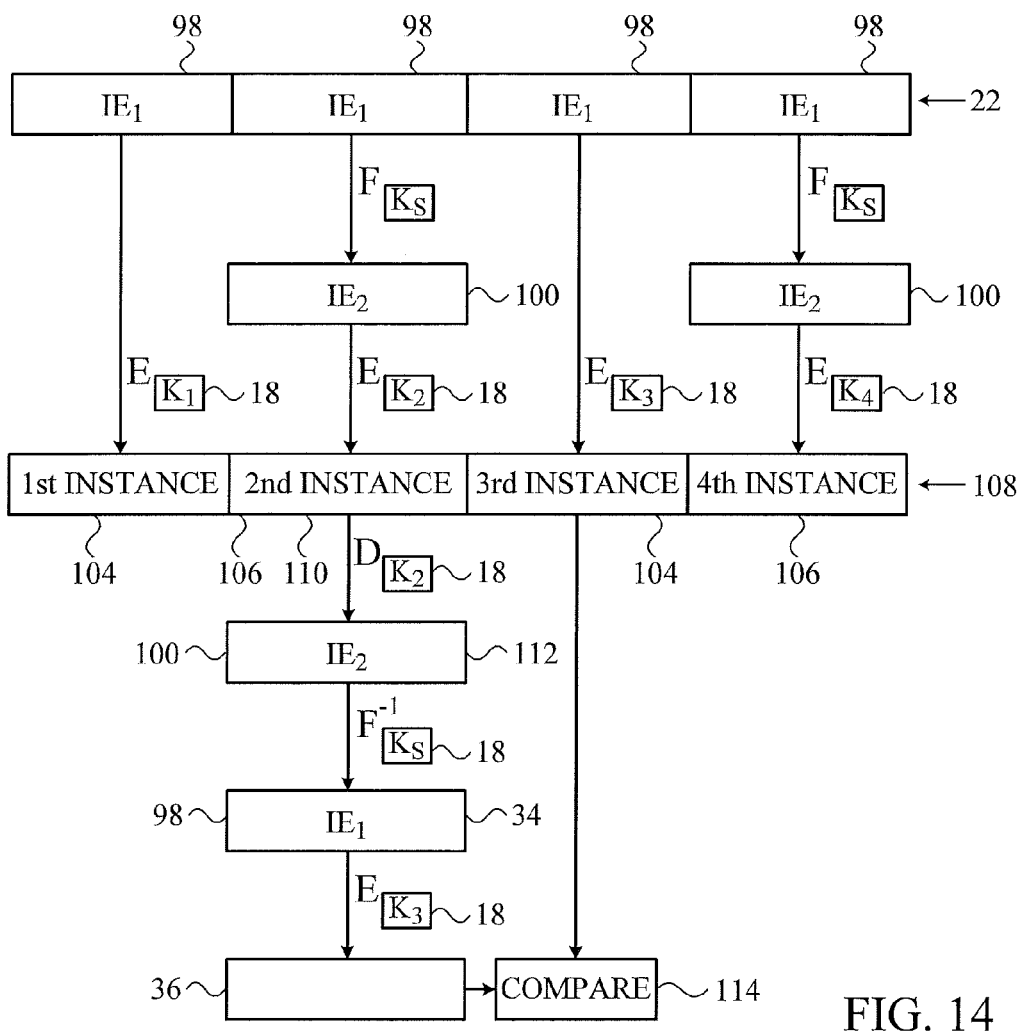
FIG. 14 is a partly pictorial, partly block diagram view of the system of FIG. 1 using a primary and secondary information element as a basis of a watermark and verifying the second information element is encoded in the watermark using an encrypted instance of a primary information element.

Reference is now made to FIG. 14, which is a partly pictorial, partly block diagram view of the system 10 of FIG. 1 using a primary information element (IE1) 98 and a secondary information element (IE2) 100 as a basis of a watermark (not shown) and verifying the second information element 100 encoded in the watermark using an encrypted instance 104 of the primary information element 98.

The basis for creating the watermark based on the primary information element 98 and the secondary information element 100 is now described.

The processor 12 (FIG. 1) is operative to process the primary information element 98 by a cryptographic function F using a secret cryptographic key $K_S$ yielding the secondary infoiination element 100.

The primary information element 98 may be derived from the secondary information element 100 by processing the secondary information element 100 by a cryptographic function $F^{-1}$ using the secret cryptographic key $K_S$. The cryptographic function $F^{-1}$ is an inverse function of the cryptographic function F.

The primary information element 98 and the secondary information element 100 may include an ID of the media object owner, an ID of the media object (e.g.: movie ID), an ID of the end-user/subscriber, a timestamp or device ID by way of example only.

The primary information element 98 may be publically known and the secondary information element 100 may not be publically known (secret) or vice-versa.

The processor 12 (FIG. 1) is then operative to process the primary information element 98 and the secondary information element 100 separately multiple times by a cryptographic function E using different ones of the cryptographic keys 18. In other words, one time the primary information element 98 is processed by the cryptographic function E with one of the cryptographic keys 18 yielding an encrypted instance 104, another time the secondary information element 100 is processed by the second cryptographic function E with a different one of the cryptographic keys 18 yielding an encrypted instance 106 and so on, so that a series of encrypted bits 108 is yielded. In the example of FIG. 14, the series of encrypted bits 108 typically includes encrypted instances 104 directly produced from the primary information element 98 with alternate encrypted instances 106 produced from the secondary information element 100.

Therefore, the series of encrypted bits 108 derives from encrypting the primary information element 98 multiple times by the cryptographic function E using a different one of the cryptographic keys 18 as input. However, some of the times, the primary information element 98 is first processed by the cryptographic function F using the secret key $K_S$ as input yielding the secondary information element 100 which is then processed by the cryptographic function E.

Extraction and verification of the primary information element 98 is now described.

The processor 12 (FIG. 1) is operative to decrypt one of the encrypted instances 106, an encrypted instance 110 (a series of N bits of the series of encrypted bits 108) by a cryptographic function D using the cryptographic key 18 (which was used to encrypt the secondary information element 100 yielding the encrypted instance 110) as input yielding an output 112. The cryptographic function D is typically an inverse of the cryptographic function E.

The processor 12 (FIG. 1) is then operative to process the output 112 by the cryptographic function $F^{-1}$ using the secret cryptographic key $K_S$ yielding the value 34. The value 34 equals the primary information element 98 if the value 34 is verified satisfactorily in the next steps.

The processor 12 (FIG. 1) is then operative to process/encrypt the value 34 by the cryptographic function E using one of the cryptographic keys 18 yielding the value 36.

The processor 12 is then operative to compare the value 36 to the adjacent encrypted instance 104 in order to provide a level of confidence that the value 34 is indeed the primary information element 98 (block 114).

It will be appreciated that the value 36 may be compared to a non-adjacent one of the encrypted instances 104 in order to verify the extracted primary information element 98.

It will also be appreciated that the value 34 may be verified against two partial encrypted instances 104 in a similar manner to that described with reference to FIG. 4.

It will additionally be appreciated that the above method may be extended to where the cryptographic key 18 used to encrypt each of the encrypted instances 104, 106 is unknown.

It will additionally be appreciated that the above method may be extended to where the position of each of the encrypted instances 104, 106 in the series of encrypted bits 108 is unknown.

The use of the primary information element 98 and the secondary information element 100 may provide security advantages in certain situations, for example, but not limited to, when the cryptographic keys 18 become compromised.

Figure 15:
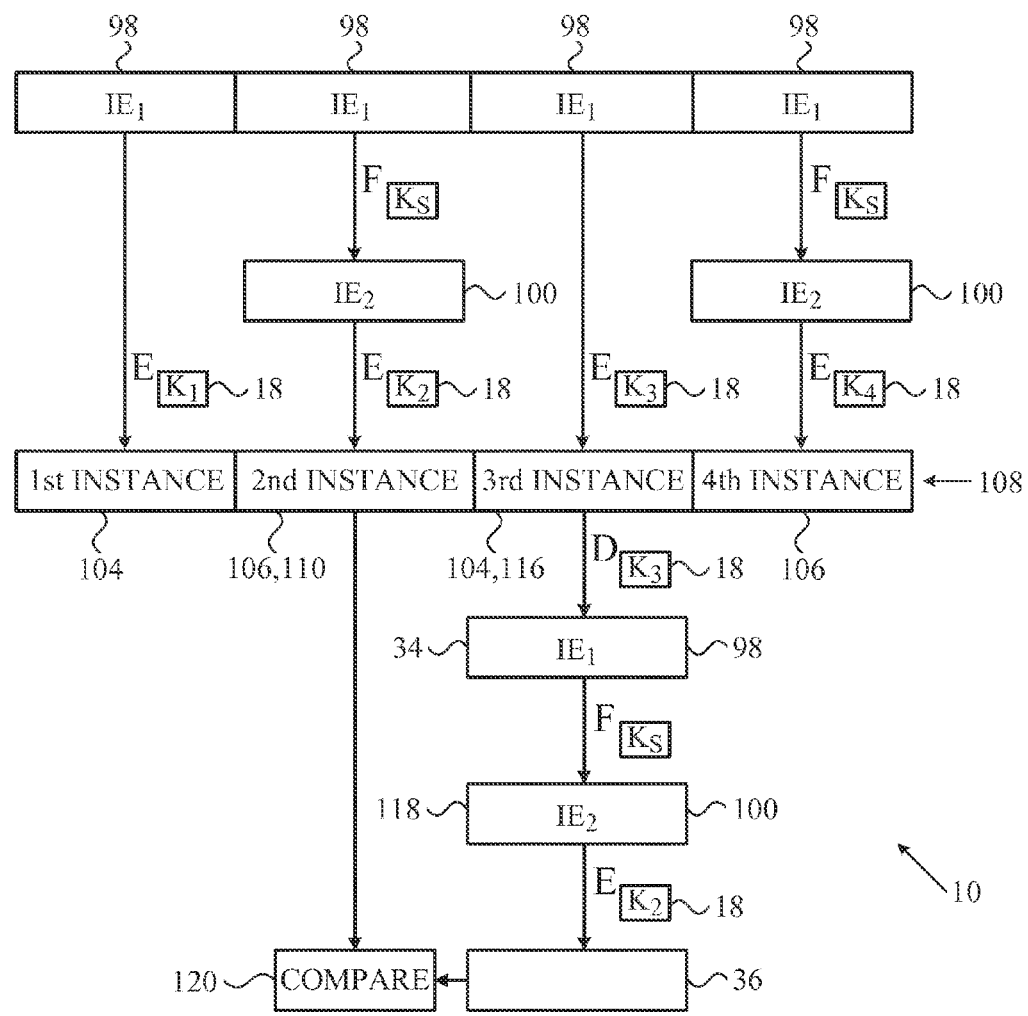
FIG. 15 is a partly pictorial, partly block diagram view of the system of FIG. 1 using a primary and secondary information element as a basis of a watermark and verifying a primary information element is encoded in the watermark using an encrypted instance of the secondary information element.

Reference is now made to FIG. 15, which is a partly pictorial, partly block diagram view of the system 10 of FIG. 1 using the primary information element 98 and secondary information element 100 as a basis of a watermark and verifying the primary information element 98 is encoded in the watermark using the encrypted instance 106, 110 of the secondary information element 100.

The processor 12 (FIG. 1) is operative to decrypt an encrypted instance 116 of the encrypted instances 104 using one of the cryptographic keys 18 yielding the value 34.

The processor is then operative to re-encrypt the value 34, including processing the value 34 by the cryptographic function F using the secret cryptographic key $K_S$ as input yielding an output 118 and then processing the output 118 by the cryptographic function E yielding the value 36.

The processor 12 is then operative to compare the value 36 to the adjacent encrypted instance 110 in order to provide a level of confidence that the value 34 is indeed the primary information element 98 (block 120).

It will be appreciated that the value 36 may be compared to a non-adjacent one of the encrypted instances 104 in order to verify the extracted primary information element 98.

It will also be appreciated that the value 34 may be verified against two partial encrypted instances 106 in a similar manner to that described with reference to FIG. 4.

It will additionally be appreciated that the above method may be extended to where the cryptographic key 18 used to encrypt each of the encrypted instances 104, 106 is unknown.

It will additionally be appreciated that the above method may be extended to where the position of each of the encrypted instances 104, 106 in the series of encrypted bits 108 is unknown and/or in cases where some of the bits of the series of encrypted bits 108 are missing or corrupted.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising: a processor; and a memory to store data used by the processor, wherein the processor is operative to: receive a media content item including a watermark embedded in the media content item, the watermark encoding a series of encrypted bits derived from encrypting an information element multiple times with a plurality of cryptographic keys such that each of the times the encryption of the information element uses a different one of the cryptographic keys yielding a plurality of encrypted instances of the information element in the series of encrypted bits, the order of the cryptographic keys used in the series of encrypted bits being defined such that an $i^{th}$ encrypted instance of the information element in the series of encrypted bits being encrypted with an $i^{th}$ one of the cryptographic keys $K_i$, the information element consisting of N bits;
identify at least part of the watermark in the media content item;
extract at least some of the encrypted bits from the at least part of the identified watermark;
decrypt a series of N bits using a first one of the cryptographic keys yielding a first value, the series of N bits including Q bits of the encrypted bits as ordered in the series of the encrypted bits and K guessed bits, K being greater than, or equal to, zero, K plus Q equaling N;

re-encrypt the first value using a second one of the cryptographic keys yielding a second value, the second cryptographic key being different from the first cryptographic key; and compare at least part of the second value to M bits of the encrypted bits as ordered in the series of the encrypted bits to determine if the at least part of the second value matches the M bits as ordered in the series of the encrypted bits in order to provide a level of confidence that the first value is indeed the information element which was encrypted and embedded as the watermark in the media content item, the Q bits and the M bits being selected from different bits of the encrypted bits, M being greater than zero;

re-encrypt the first value using a third one of the cryptographic keys yielding a third value, the third cryptographic key being different from the first cryptographic key and the second cryptographic key; and compare the at least part of the third value to P bits of the encrypted bits as ordered in the series of the encrypted bits to determine if the at least part of the third value matches the P bits as ordered in the series of the encrypted bits in order to provide a further level of confidence that the first value is the information element which was encrypted and embedded as the watermark in the media content item, the Q bits and the M bits and the P bits being selected from different bits of the encrypted bits, the M bits and the P bits corresponding to different parts of the information element, and wherein:

the first cryptographic key is a $j^{th}$ one of the cryptographic keys; j is an integer;

the M bits and the P bits are positioned in encrypted instances of the information element which are either side of one of the encrypted instances of the information element which includes the Q bits;

the second cryptographic key is a $j+1^{th}$ one of the cryptographic keys; and the third cryptographic key is a $j-1^{th}$ ; one of the cryptographic keys.

2. The system according to claim 1, wherein: the media content item does not indicate which of the cryptographic keys were used to encrypt the encrypted instances of the information element; and the processor is operative, via a process of trial and error, to perform the decryption of the series of N bits and the re-encryption of the first value and the comparison of the at least part of the second value to the M bits using different values of j until it is determined that the at least part of the second value matches the M bits as ordered in the series of the encrypted bits.

3. The system according to claim 1, wherein: the media content item does not indicate which of the cryptographic keys were used to encrypt the encrypted instances of the information element; and the processor is operative, via a process of trial and error to perform the decryption of the series of N bits and the re-encryption of the first value and the comparison of the at least part of the second value to the M bits using different combinations of the cryptographic keys until it is determined that at least part of the second value matches the M bits as ordered in the series of the encrypted bits.

4. The system according to claim 1, wherein the watermark includes at least one indicator to indicate positioning of each of the encrypted instances of the information element within the watermark and which ones of the cryptographic keys were used to encrypt each of the encrypted instances.

5. The system according to claim 1, wherein M plus P is equal to N.

6. The system according to claim 1, wherein M plus P is less than N.

7. The system according to claim 1, wherein: the media content item does not indicate which of the cryptographic keys were used to encrypt the encrypted instances of the information element; and the processor is operative, via a process of trial and error, to perform the decryption of the first N bits and the re-encryption of the first value and the comparison of the at least part of the second value to the M bits and the at least part of the third value to the P bits using different values of j until it is determined that the at least part of the second value matches the M bits as ordered in the series of the encrypted bits and that the at least part of the third value matches the P bits as ordered in the series of the encrypted bits.

8. The system according to claim 1, wherein: the media content item does not indicate which of the cryptographic keys were used to encrypt the encrypted instances of the information element; and the processor is operative, via a process of trial and error, to perform the decryption of the first N bits and the re-encryption of the first value and the comparison of the at least part of the second value to the M bits and the at least part of the third value to the P bits using different combinations of the cryptographic keys until it is determined that the at least part of the second value matches the M bits as ordered in the series of the encrypted bits and that the at least part of the third value matches the P bits as ordered in the series of the encrypted bits.

9. The system according to claim 1, wherein:

the position of the encrypted instances of the information element in the at least some encrypted bits extracted from the at least part of the identified watermark is unknown; and the processor is operative, by a process of trial and error, to perform the decryption of the series of N bits and the re-encryption of the first value and the comparison of the at least part of the second value to the M bits based on different positions of the series of N bits and the M bits within the series of encrypted bits until it is determined that the at least part of the second value matches the M bits as ordered in the series of the encrypted bits.

10. The system according to claim 1, wherein: some of the encrypted instances of the information element are derived from the information element being processed by a first cryptographic function using a secret key as input yielding a secondary information element which is then processed by a second cryptographic function using a different one of the cryptographic keys as input; and the decryption of the series of N bits includes processing the series of N bits by a third cryptographic function using the first cryptographic key as input yielding an output and then processing the output by a fourth cryptographic function yielding the first value, the third cryptographic function being an inverse function of the second cryptographic function, the fourth cryptographic function being an inverse function of the first cryptographic function.

11. The system according to claim 10, wherein:

the information element is publically known and the secondary information element is not publically known; or the information element is not publically known and the secondary information element is publically known.

12. The system according to claim 1, wherein: some of the encrypted instances of the information element are derived from the information element being processed by a first cryptographic function using a secret key as input yielding a secondary information element which is then processed by a second cryptographic function using a different one of the cryptographic keys as input; and the re-encryption of the first value includes processing the first value by the first cryptographic function using the secret key as input yielding an output and then processing the output by the second cryptographic function yielding the second value.

13. The system according to claim 12, wherein
the information element is publically known and the secondary information element is not publically known; or
the information element is not publically known and the secondary information element is publically known.

14. The system according to claim 1, wherein each of the cryptographic keys comprises a corresponding encryption key and decryption key to enable asymmetric encryption/decryption.

15. The system according to claim 1, wherein each of the cryptographic keys is a symmetric cryptographic key used in both encryption and decryption.

16. A method comprising: receiving a media content item including a watermark embedded in the media content item, the watermark encoding a series of encrypted bits derived from encrypting an information element multiple times with a plurality of cryptographic keys such that each of the times the encryption of the information element uses a different one of the cryptographic keys yielding a plurality of encrypted instances of the information element in the series of encrypted bits, the order of the cryptographic keys used in the series of encrypted bits being defined such that an $i^{th}$ encrypted instance of the information element in the series of encrypted bits being encrypted with an $i^{th}$ one of the cryptographic keys $K_i$, the information element consisting of N bits; identifying at least part of the watermark in the media content item; extracting at least some of the encrypted bits from the at least part of the identified watermark; decrypting a series of N bits using a first one of the cryptographic keys yielding a first value, the series of N bits including Q bits of the encrypted bits as ordered in the series of the encrypted bits and K guessed bits, K being greater than, or equal to, zero, K plus Q equaling N;

re-encrypting the first value using a second one of the cryptographic keys yielding a second value, the second cryptographic key being different from the first cryptographic key; and
comparing at least part of the second value to M bits of the encrypted bits as ordered in the series of the encrypted bits to determine if the at least part of the second value matches the M bits as ordered in the series of the encrypted bits in order to provide a level of confidence that the first value is indeed the information element which was encrypted and embedded as the watermark in the media content item, the Q bits and the M bits being selected from different bits of the encrypted bits, M being greater than zero;
re-encrypting the first value using a third one of the cryptographic keys yielding a third value,
the third cryptographic key being different from the first cryptographic key and the second cryptographic key; and
comparing the at least part of the third value to P bits of the encrypted bits as ordered in the series of the encrypted bits to determine if the at least part of the third value matches the P bits as ordered in the series of the encrypted bits in order to provide a further level of confidence that the first value is the information element which was encrypted and embedded as the watermark in the media content item, the Q bits and the M bits and the P bits being selected from different bits of the encrypted bits, the M bits and the P bits corresponding to different parts of the information element, and wherein:
the first cryptographic key is a $j^{th}$ one of the cryptographic keys; j is an integer;
the M bits and the P bits are positioned in encrypted instances of the information element which are either side of one of the encrypted instances of the information element which includes the Q bits;
the second cryptographic key is a $j+1^{th}$ one of the cryptographic keys; and
the third cryptographic key is a $j-1^{th}$ one of the cryptographic keys.

* * * * *

UNITED STATES PATENT AND TRADEMARK OFFICE
CERTIFICATE OF CORRECTION

PATENT NO. : 9,137,010 B2
APPLICATION NO. : 14/153387
DATED : September 15, 2015
INVENTOR(S) : Sella et al.

It is certified that error appears in the above-identified patent and that said Letters Patent is hereby corrected as shown below:

Specification

In column 7, line 34, delete "(IF)" and substitute therefor --(IE)--.

In column 10, line 23, delete "2K" and substitute therefor --$2^K$--.

In column 14, line 42, delete "infoiination" and substitute therefor --information--.

Signed and Sealed this
Ninth Day of February, 2016

Michelle K. Lee
*Director of the United States Patent and Trademark Office*